Sept. 20, 1938.  E. F. PAWSAT  2,130,696
MUDGUARD SUPPORT
Filed Dec. 5, 1936
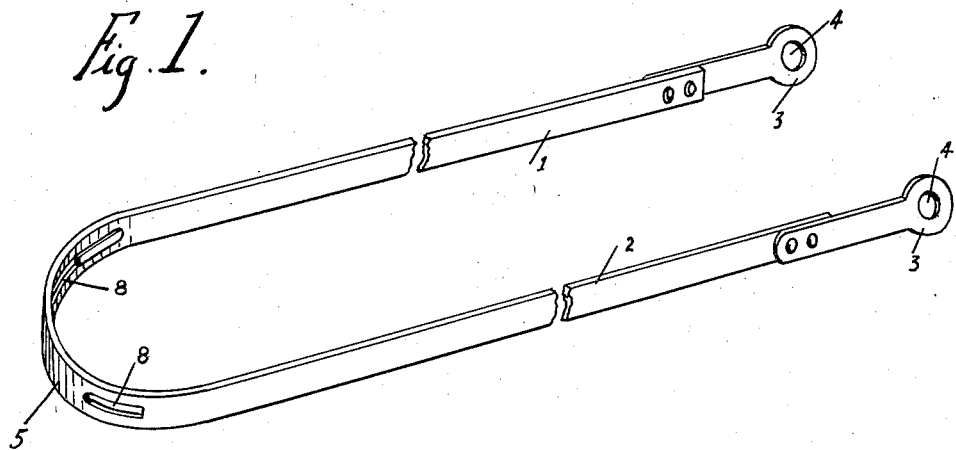
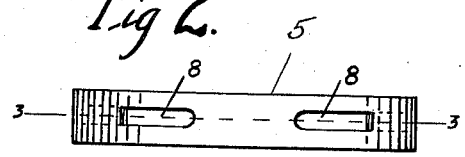
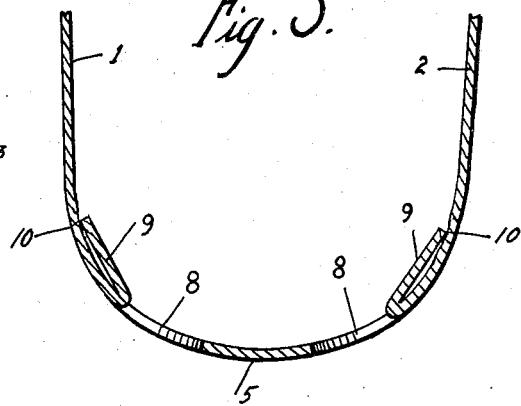
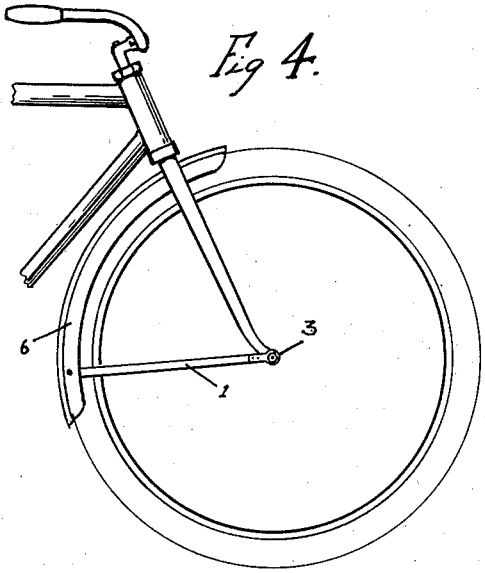
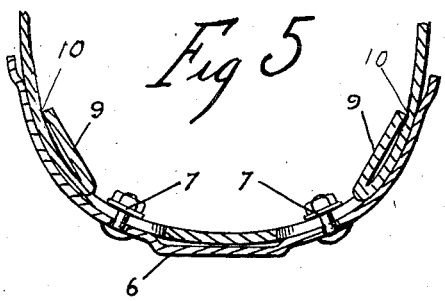
Inventor.
Ewald F. Pawsat,
By Arthur N. Ewald,
Attorney.

Patented Sept. 20, 1938

2,130,696

UNITED STATES PATENT OFFICE 2,130,696

MUDGUARD SUPPORT

Ewald F. Pawsat, Maysville, Ky., assignor to Wald Manufacturing Company, Incorporated, a corporation of Kentucky Application December 5, 1936, Serial No. 114,459

1 Claim. (Cl. 280—152.1)

The present invention relates to supports for mudguards for bicycles, motorcycles and similar vehicles.

The current trend in the making of mudguards for bicycles, motorcycles and similar vehicles is to increase the size of such mudguards, this resulting in part at least from the increase in sectional diameter of the tires used on the wheels of such vehicles, as well as from the desire for improved appearance. These larger mudguards are not all of uniform dimensions nor are the means of attaching the same to the supports uniform. It is, therefore, desirable in order to adapt the support to a variety of mudguards that the same be provided with attaching means of wide and variable adaptability.

The principal object of the present invention accordingly is to provide a mudguard support which is adapted for the attachment of mudguards of various dimensions.

Incident, of course, to the increase in size and dimension of the mudguards is an increase in their weight thus necessitating additional strength and bracing properties in the support in order to maintain the same securely against vibration and rattling during use.

A further object of my invention therefore, is to provide reinforcing elements in a mudguard support adapting it to the increased loading of larger and heavier mudguards.

Further objects of my invention will appear from the following detailed description thereof.

In the drawing:

Figure 1 is a mudguard support constructed in accordance with this invention.

Figure 2 is an end view of said support.

Figure 3 is a sectional view of line 3—3 of Figure 2.

Figure 4 is an elevation of a portion of a mudguard to which the present invention is adapted.

Figure 5 is an elevation of a portion of a bicycle showing the mudguard support in use.

The numerals 1 and 2 indicate respectively the legs of a substantially U-shaped mudguard brace. The ends 3—3 of the legs 1 and 2 are provided with perforations 4—4 by means of which the support is arranged to be mounted on the axle of a bicycle or similar vehicle. The rounded end 5 of the U-shaped support is adapted to fit inside the mudguard 6 in the usual manner. The mudguard 6 is provided with perforations 7—7 for bolts by means of which it is secured to the end 5 of the support; these perforations vary in spacing not only according to the dimension of the mudguard itself but more or less arbitrarily also in accordance to the desire or convenience of the manufacturer. In order to adapt the support to receive the bolts inserted through the perforations 7—7 of the mudguard, throughout a wide range of varying displacement of said perforations, the end 5 of the support is provided with slots 8—8 disposed on opposite sides of the longitudinal axis of the support, as clearly shown in the several figures of the drawing.

The slots 8—8 may, of course, be stamped out when forming the support, the contained metal being entirely removed, thus leaving the slots only. However, in order to provide additional bracing and strengthening elements for said support at the sides of the mudguard when attached, I prefer not to remove the metal entirely, but to leave tongues 9—9 attached to the outer ends of the slots 8—8. These tongues are bent backwardly so as to abut against the side elements of the support at abutting angles 10—10. The tongues therefore act as struts between the outer end 5 of the support which in use carries the mudguard, and the legs 1 and 2 of said support and thus effectively distribute the weight and strain on the support, increasing the durability and life thereof.

From the foregoing description the nature and use of my invention will be apparent.

It will be understood also that various modifications in the details of construction as above described and illustrated in the drawing, may be made without departing from the spirit and scope of my invention as defined in the appended claim.

Having thus fully described my invention, what I claim as new and desire to secure by Letters Patent is:

A mudguard support of the type mentioned comprising a substantially U-shaped element having a rounded end adapted to fit inside of mudguard, said end being provided with a plurality of slots adapted to receive bolts for attaching said mudguard, said slots being formed by leaving the contained tongues attached at the outer ends of the slots, and by bending same back so that they span the lateral arcs of the guard end and their free ends abut against the side members of said element at points inside the lateral bearing span of said mudguard to form reinforcing struts.

EWALD F. PAWSAT.